United States Patent [19]
Silver

[11] Patent Number: 5,853,488
[45] Date of Patent: Dec. 29, 1998

[54] PROCESSES FOR EXTRACTING SUGARS FROM DATES AND FOR MAKING NOVEL FOOD PRODUCTS

[76] Inventor: Barnard Stewart Silver, 4391 Carol Jane Dr., Salt Lake city, Utah 84124-3601

[21] Appl. No.: 834,739

[22] Filed: Apr. 3, 1997

Related U.S. Application Data

[63] Continuation-in-part of Ser. No. 653,502, May 24, 1996, Pat. No. 5,700,464, which is a continuation of Ser. No. 443,579, May 17, 1995, abandoned, which is a continuation-in-part of Ser. No. 289,923, Aug. 12, 1994, Pat. No. 5,456,893, which is a continuation-in-part of Ser. No. 106,077, Aug. 18, 1993, abandoned.

[51] Int. Cl.$^6$ .............................. C13D 1/00; C13F 1/08; C13J 1/08; C08B 30/00
[52] U.S. Cl. ............................. 127/43; 127/34; 127/42; 127/45
[58] Field of Search .................... 127/34, 42, 43, 127/45

[56] References Cited

U.S. PATENT DOCUMENTS

| | | | |
|---|---|---|---|
| 2,451,081 | 10/1948 | Ford | 422/268 |
| 2,502,939 | 4/1950 | Frynta | 127/5 |
| 2,516,968 | 8/1950 | Faler | 422/268 |
| 2,645,589 | 7/1953 | Langen | 127/7 |
| 2,686,192 | 8/1954 | Bonotto | 134/25.1 |
| 2,713,009 | 7/1955 | Brüniche-Olsen et al. | 127/7 |
| 2,857,907 | 10/1958 | Kaether et al. | 127/7 |
| 2,885,311 | 5/1959 | Brüniche-Olsen et al. | 8/155 |
| 2,950,998 | 8/1960 | Stewart et al. | 127/7 |
| 3,142,589 | 7/1964 | Schaffer et al. | 127/3 |
| 3,147,212 | 9/1964 | Van Koppen et al. | 134/25.1 |
| 3,195,446 | 7/1965 | French | 100/37 |
| 3,329,541 | 7/1967 | Mears | 156/11 |
| 3,355,260 | 11/1967 | Brëniche-Olsen | 213/310 |
| 3,420,708 | 1/1969 | Schaffer | 422/268 |
| 3,433,598 | 3/1969 | Faaborg-Andersen et al. | 422/268 |
| 3,471,328 | 10/1969 | Brüniche-Olsen | 127/5 |
| 3,565,634 | 2/1971 | Osternan | 422/261 |
| 3,573,982 | 4/1971 | Silver | 127/5 |
| 3,971,682 | 7/1976 | Frantzen et al. | 156/11 |
| 4,013,498 | 3/1977 | Frantzen et al. | 156/345 |
| 4,101,285 | 7/1978 | Tilby | 23/270 B |
| 4,124,437 | 11/1978 | Bond et al. | 156/640 |
| 4,751,060 | 6/1988 | Kratochwill | 422/268 |
| 4,857,279 | 8/1989 | Kawamata et al. | 422/268 |
| 4,956,176 | 9/1990 | Moorman | 426/478 |
| 5,207,904 | 5/1993 | Abel | 210/252 |
| 5,456,893 | 10/1995 | Silver | 327/174 |
| 8,700,464 | 12/1997 | Silver | 424/123 |

OTHER PUBLICATIONS

Shubber, B. H. "Sugar Extraction from Dates". Date Palm Journal, (1981), 1(1), pp. 61–78, 1981.

Ehrenberg, J. "Production of Liquid Sugar from Dates". Zucker, (1977), 30(11), pp. 612–619, 1977.

Milner. "Selection of Proper Working Screens For Continuous Sugar Centrifugals," 1992. (Month N/A).

*Primary Examiner*—Mark L. Bell
*Assistant Examiner*—Patricia L. Hailey
*Attorney, Agent, or Firm*—Brinks Hofer Gilson & Lione

[57] ABSTRACT

Processes for extracting three sugars, fructose, sucrose and glucose, from dates are disclosed. Pitted dates are frozen and subdivided into particles. The particles are contacted with a heated water solution to extract the sugars from the date fibers. The sugar enriched water solution is separated from the date fibers by passing the water solution through one or more milli-screens. The sugar enriched water solution may be purified, and also may be treated to reduce the water content. The sugar solution containing the three sugars is a novel food product which can be used as a sweetener, for example, for sweetening soft drinks. Alternatively, the liquid product may be freeze-dried, vacuum oven-dried or spray-dried to produce a novel solid product containing the three sugars. The date fibers are dewatered, and admixed with ground date seeds to produce another novel food product.

21 Claims, 7 Drawing Sheets

PROCESSES FOR EXTRACTING SUGARS FROM DATES AND FOR MAKING NOVEL FOOD PRODUCTS

This application is a continuation-in-part of U.S. application Ser. No. 653,502, filed May 24, 1996, now U.S. Pat. No. 5,700,464, which is a continuation of Ser. No. 08/443,579, filed May 17, 1995, now abandoned, which is a continuation-in-part of Ser. No. 289,923, filed Aug. 12, 1994, now U.S. Pat. No. 5,456,893, which is a continuation in part of Ser. No. 08/106,077, filed Aug. 18, 1993, now abandoned.

FIELD OF THE INVENTION

This invention is directed to processes for extracting sugars from dates, and for making novel food products.

BACKGROUND OF THE INVENTION

The dates of commerce are the fruit of the species of palm, *Phoenix dactylifera*. Another species, *Phoenix sylvestis*, which is very closely related to the date palm, also produces dates. Dates are known to contain high amounts of sugars, amounts ranging as high as 50% to 60% by weight.

In the past, some sugar has been recovered from dates by pressing the fruit to release some of the sugars in their natural liquids. Pressing, however, is not a commercially viable process for a number of reasons. Pressing breaks down the hemicellulose walls and releases impurities which are difficult, and expensive, to separate in a commercial operation. Moreover, pressing only recovers a fraction of the large amounts of the sugars available in dates.

Although dates are known to contain large amounts of sugars, the extraction of their sugars has formidable obstacles which have prevented their recovery on a commercial scale. The skins and the cell membranes of dates are tough, and the fruit has a gummy consistency, so that they are not easily broken and subdivided, in order to extract the sugars efficiently.

Dates are known to contain three sugars: fructose, sucrose and glucose. In the past, attempts to extract sucrose, fructose and glucose from plant materials simultaneously has not been commercially successful. It has been the custom in the extraction and purification of sucrose to single out sucrose individually, and to treat the fructose and glucose as impurities, and not to recover them. In plants containing a high percentage of fructose, it has been difficult to recover the fructose singularly, because of other impurities. Thus, plants containing a predominance of fructose, such as oranges or grapes, are sold without processing them for supplying the fructose for human consumption. In the case of grapes, the fructose is processed into alcohol for a greater financial return. As a result, fructose is generally produced from plants high in carbohydrates, like corn, where the carbohydrate (i.e., starch of the corn) is converted enzymatically, or by some other means, to fructose.

Glucose is often produced as a by-product in the chemical or enzymatic processing for fructose, and is often included with the fructose in liquid sugars. Sucrose is sometimes chemically or enzymatically converted to fructose and glucose to produce liquid sugars.

Liquid sugars containing sucrose, fructose and glucose naturally blended have not been available commercially heretofore. Dates are unique in not only containing these three sugars blended together in the natural state, but also in having these sugars present in high quantities. The relative amounts of these three sugars in dates varies with the region in which they are produced. For example, dates from Algeria contain fructose in the largest proportion, whereas dates from Southern California contain sucrose in the largest proportion of the three sugars.

As indicated above, dates are difficult to comminute, as by grinding, pulverizing, chopping or slicing, because of their tough skin and cell walls, and their gummy consistency. For this reason, they are most often sold and used as articles of commerce as the intact fruit, pitted, or unpitted. The several other parts of dates, however, also may yield products of value to the area where they are grown. The seeds, or pits, for example, are sometimes ground and used for feed stock. The stems of a small species *Phoenix farinifera* are sometimes processed to make a date palm meal.

OBJECTIVES OF THE INVENTION

Accordingly, it is an object of the present invention to provide processes for extracting sugars from dates, and, in particular, to provide processes in which the efficiencies of extraction are increased sufficiently for the recovery of the sugars on a commercial scale.

It is a further object of the invention to overcome the difficulty of subdividing the dates preparatory to extraction.

It is another object of the invention to extract the sugars of dates, fructose, sucrose and glucose, simultaneously.

It is still another object of the invention to prepare novel food products from the dates.

Other objectives and benefits of the invention will be apparent from the following description and the accompanying drawings.

DETAILED DESCRIPTION OF THE INVENTION

In accordance with the objects of the invention, it has been discovered that sugars can be satisfactorily extracted from dates, provided they are suitably prepared and subdivided into particles. As a result of the suitable preparation, the extraction efficiency of the dates is increased, and more efficient extraction is possible. Moreover, continuous extraction can be performed.

In accordance with the objects of the invention, it has now been discovered that dates can be subdivided, or comminuted, if they are at least partially frozen. While at least partially frozen, the dates can be subdivided to particle sizes that can be extracted.

Figure 1:
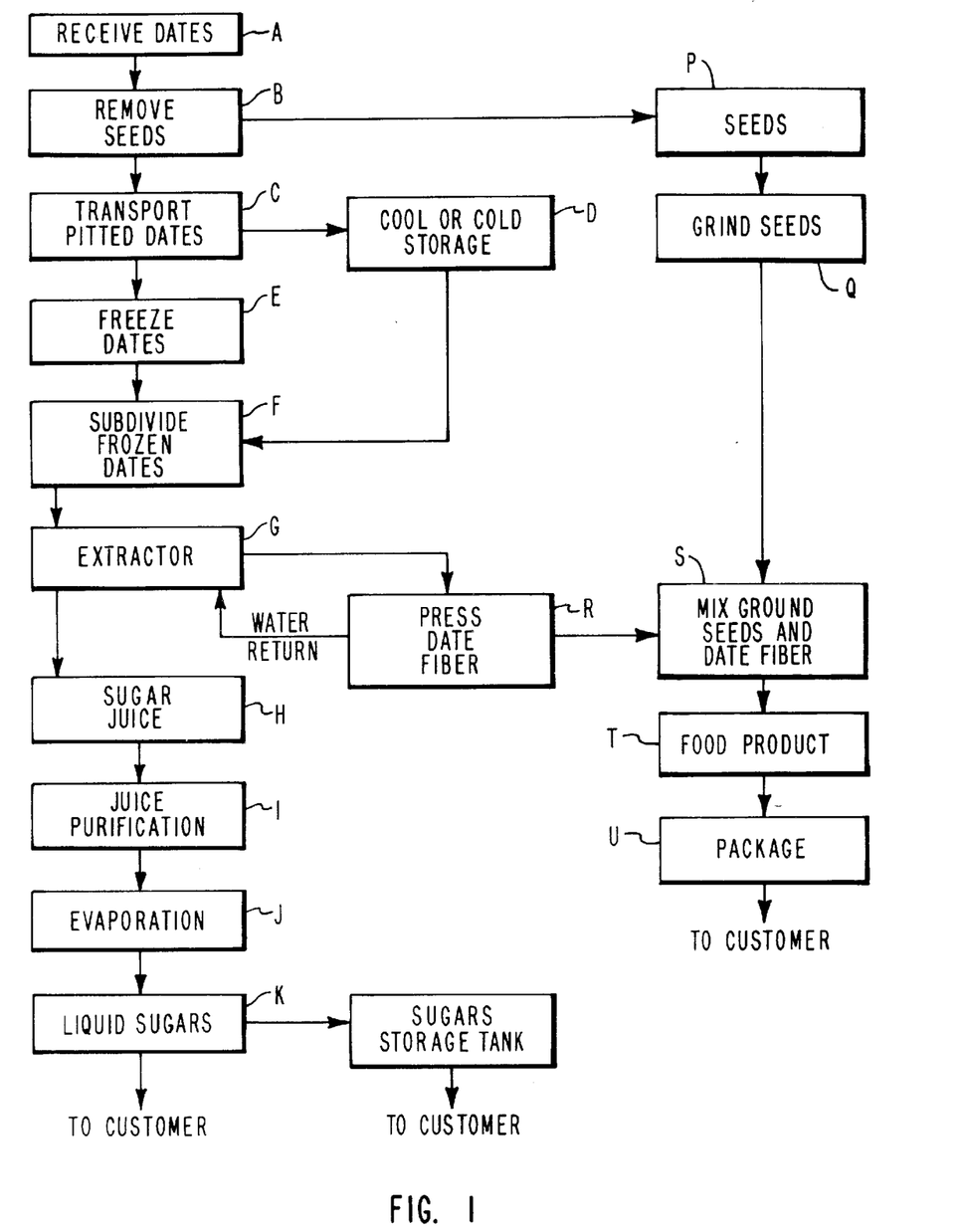
FIG. 1 is a flow chart illustrating the stages employed for extracting sugars from dates, and which illustrate by diagram at least some of the steps in the process of the invention.

Referring now to the flow diagram in FIG. 1, preferred embodiments of the processes are summarized. As indicated, the raw dates are received at A, and the seeds removed at B. The pitted dates are either transported as at C to cool, or cold storage D, or immediately frozen at E. The frozen dates are subdivided at F, and introduced into an extractor G. The extractor then removes sugars from the subdivided dates, and extracted date fibers are sent to a dewatering press R. The sugar juice H from the extractor G may be purified at I, and concentrated, as by evaporation of water at J, which is sold as liquid sugar K to customers for various uses, such as liquid sweeteners for soft drinks, or goes to sugar storage tanks, and then to customers.

Also, as indicated, the seeds P removed from the dates may be ground at Q, and mixed with the dewatered date fibers at S to make novel food products T which may be packaged at U for sale to customers.

Returning now to stage B of FIG. 1, the steps of the processes will be described in more detail. The dates are pitted, as indicated, to remove the seeds. The pitting operation can be done manually or by using suitable mechanical devices known in the art.

The pitted dates are then at least partially frozen. The freezing, or partial freezing, of the dates is important to suitable preparation for extraction of the sugars. Freezing can take place in many different ways and using many different techniques. According to one technique, the dates are placed on trays, for example, such as moving trays, or belts, passing through a freezing section, or they may be sent to storage, preferably cold or cool storages, or stored in a freezer. The temperatures necessary to freeze dates usually are well below 32° F. The dates are maintained in the freezing section preferably until they are froze sufficiently for subdividing. There is a wide variety of techniques and methods for freezing food products and most of them can be employed in the processes of the invention for freezing the dates.

The cells of dates contain sugar-water mixtures that lower the freezing point of the cells below the freezing point of water. If the sugar-water mixture is not completely frozen, the date particles may remain gummy and interfere with the subsequent comminuting operation. Accordingly, the date particles preferably should be frozen at sufficiently low temperatures and for sufficient times to substantially eliminate their gumminess.

Partial freezing, however, conveys some benefits to the step of subdividing the dates. Accordingly, the present invention is intended to cover the step of subdividing dates that are at least partially frozen, a range of freezing that covers partially frozen to frozen sufficiently to eliminate gumminess of the dates in order to make them suitable for subdividing.

After the dates are frozen, they may be stored, or immediately comminuted, for example, by slicing, using equipment for slicing sugar beets known in the sugar beet industry. The slices are cut so that at least a majority usually have a thickness less than 0.4 inches, preferably less than about 0.25 inches and desirably less than about 0.125 inches. In general, the smaller the slices, the more efficient is extraction of the sugar.

In addition to slicing, the dates may be ground, chopped, or pulverized while frozen to further decrease their size and form small particles in order to improve the extraction efficiency. Thus, the slices may be introduced into grinders, choppers, or pulverizers, preferably while frozen, to further reduce the particle size, and to increase the amount of the small particles and fines. Small particles and fines refer to subdivided date particles smaller than about 0.125 inch in cross-section. Fines are usually regarded as particles that will pass a five (5) U.S. Mesh screen.

In some instances, it may be desirable to subdivide the frozen dates with a grinder, chopper, or pulverizer, or other comminuting mechanism, without slicing.

After the dates are subdivided, they are introduced into an extractor. The subdivided dates may be fed to the extractor while frozen, or partially frozen, since, as the dates contact heated water, their temperatures will be elevated, and the frozen state phased out. Alternatively, the frozen date particles may be thawed, or partially thawed, before feeding to the extractor.

Figure 2:
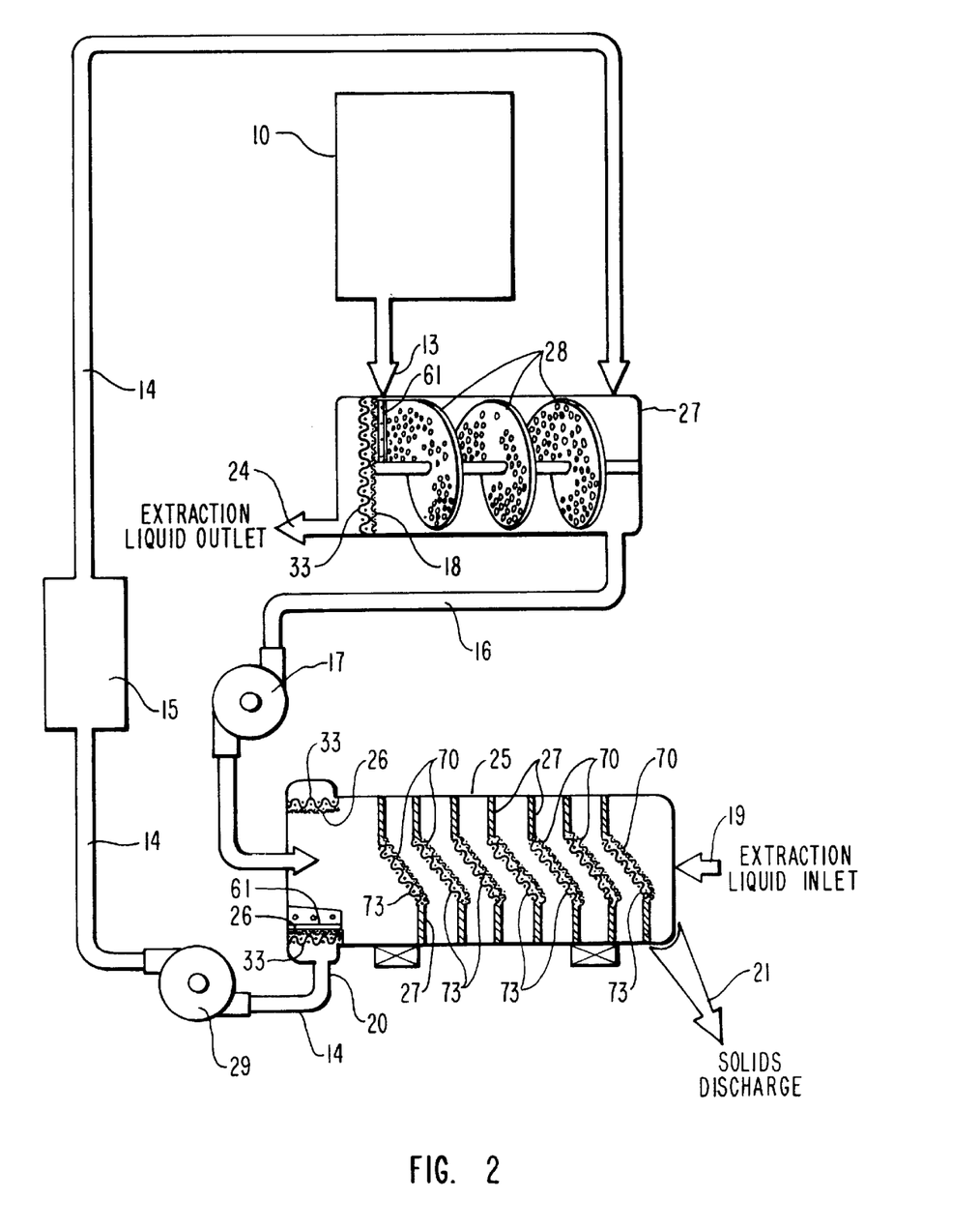
FIG. 2 is a diagrammatic illustration in longitudinal cross section of a system for extracting sugars from dates using a horizontal diffuser (also called an "R.T." diffuser).
Figure 3:
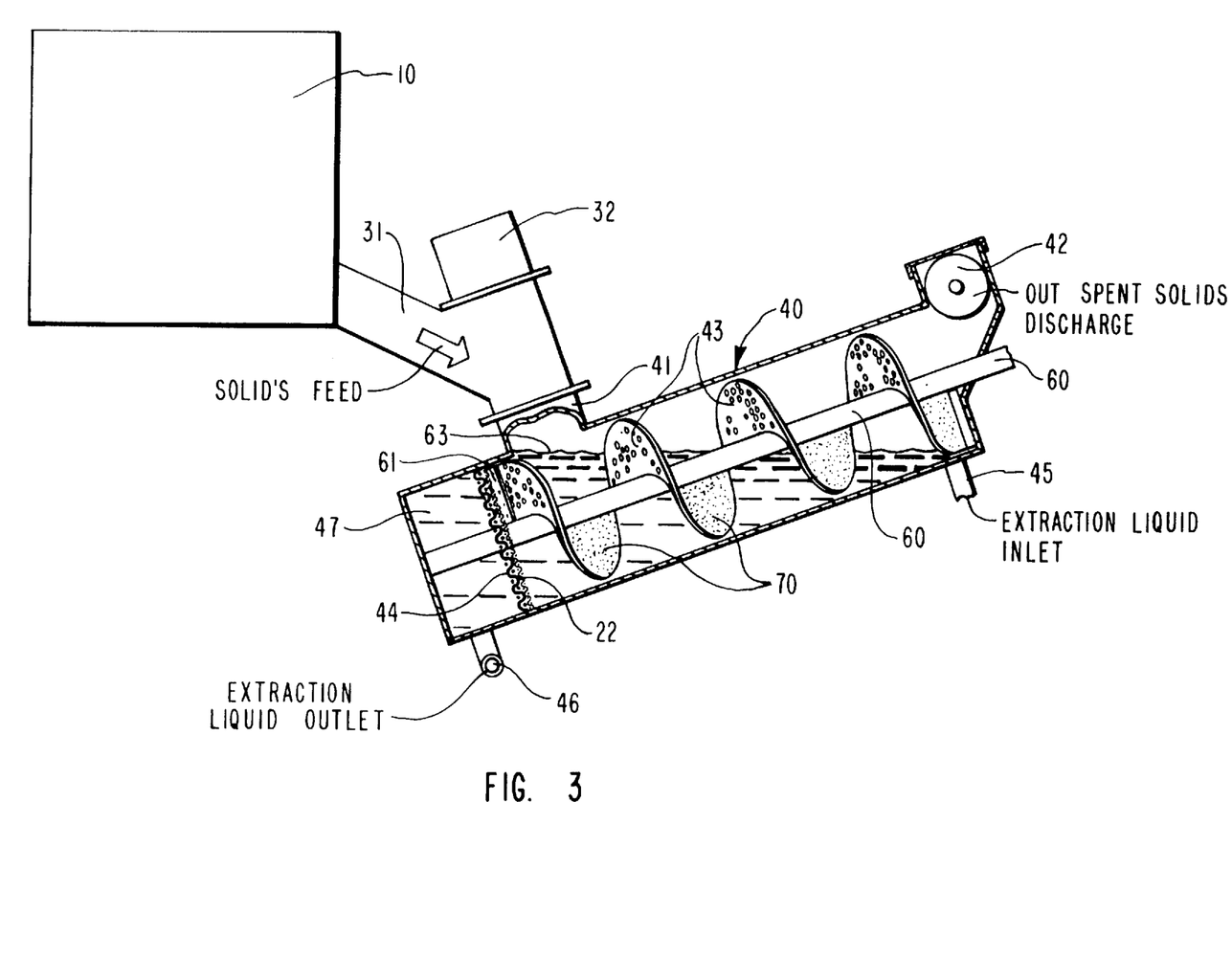
FIG. 3 is a diagrammatic illustration in longitudinal cross-section of a slope diffuser for extracting sugars from dates.

Suitable extractors for carrying out the present invention are shown in U.S. Pat. No. 5,456,893 which is incorporated herein by reference. The extractor used in the process of the present invention may be either of the batch, or the continuous type; the continuous type extractor is preferred for most situations because of its higher extraction efficiency. The preferred continuous extractors or diffusers are shown in FIGS. 2 and 3 of the drawings. In addition, the tower, or vertical diffuser, may be used in the processes of the invention.

Referring to FIG. 2, one preferred type of continuous extractor or diffuser is illustrated diagrammatically which may be used to extract sugars from dates. After subdividing, such as by slicing, the subdivided date particles are introduced into a hydrator 27. In the hydrator, the subdivided date particles are contacted with a hot extraction juice solution from the diffuser 25 through screen 26 through line 14 and through pump 29. Prior to being introduced into the hydrator 27, the water solution from the diffuser is heated in heater 15 to temperatures of 160° F. to 190° F. The hot extraction water solution introduced by line 14 into the hydrator thaws the frozen dates, if they are not already thawed, and "kills" the cells in the subdivided date particles so as to permit osmotic or lixiviation flow of sugar from the date cells into the extracting liquid. The date particles are conveyed either by concurrent or countercurrent flow through the heated juice solution for a short time, after which they are transferred by line 16 and pump 17 to the horizontal diffuser 25. In order to move the subdivided dates in hydrator 27, flights 28 in a scroll conveyor push the solids from the inlet 13 to the outlet and line 16. The flights 28 preferably are provided with milli-screens, as described hereinafter in connection with FIGS. 4 and 5. A milli-screen 18 and supporting grid 33 are also provided upstream of the extraction liquid outlet 24. One or more wipers 61 may be installed to wipe clean the screen.

As illustrated in FIG. 2, the subdivided dates from the hydrator are transferred by a line 16 and pump 17 as a solids/liquid feed into the diffuser 25. In the horizontal diffuser 25, continuous extraction occurs between the subdivided dates and the extraction liquid during countercurrent flow of the dates and water solution.

The extraction liquid is introduced at 19 and withdrawn at 20, flowing countercurrent to the solids. The drum 25 is rotated by a suitable mechanism (not shown). The rotating drum 25 scrolls the date solids to discharge 21 by helical-type scrolling members 27. The scrolling members 27 are mounted to the outer cylindrical wall of the drum 25, and push the solids therethrough to the successive screen baskets 73 which in turn are covered by milli-screens 70. As the drum 25 rotates, the helical-type scrolling members 27 rotate, and push the date particles toward the discharge 21.

The horizontal diffuser is so arranged that the extraction liquid introduced at 19 at one end of the drum 25 reaches the other end of the drum after a number of revolutions equal to half the number of compartments in the drum. The subdivided dates travel in a countercurrent direction to the extraction liquid, but at half the rate of flow of the extraction liquid. The screen baskets 73 mounted in each compartment will lift the subdivided dates out of the extraction liquid as the diffuser drum rotates upward, and the dates will substantially drain of liquid. On the downward turn of the drum 25, the dates will drop out of the screen baskets and slide over solid sloping plates 27 into the second compartment ahead. Milli-screens 70 are provided to cover the screens 73 in each basket so at to control the small particles and fibers. As the horizontal diffuser rotates and the screen baskets carry the date particles and extracting liquid upward, the date particles slide along the milli-screen 70, wiping the milli-screen surfaces and allowing passage of extraction liquid therethrough. It is important to have a milli-screen 26 with a supporting grid 33 and screen wiper(s) 61 mounted to the date feed end of the drum, and upstream from the liquid outlet 20.

Figure 4:
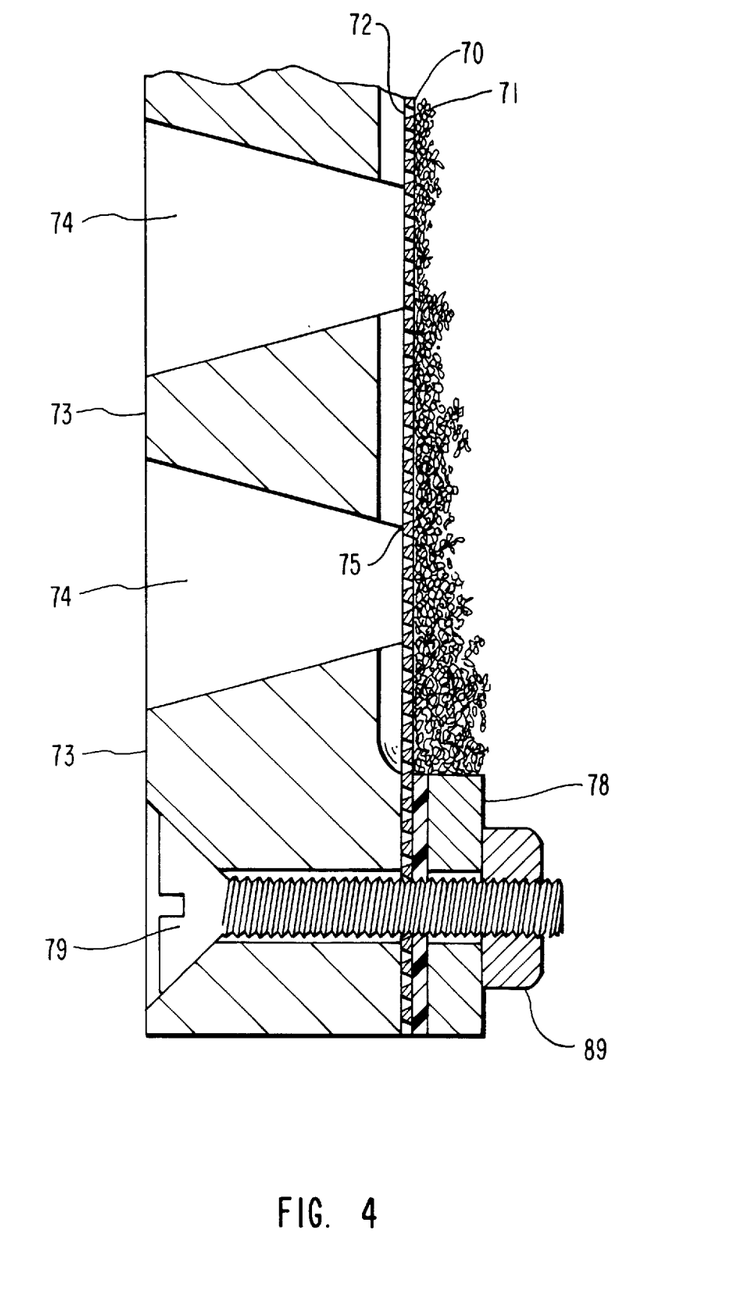
FIG. 4 is an enlarged fragmentary view illustrating a portion of a screen embodying the milli-screen used in the extractors of FIGS. 2 and 3.
Figure 5:
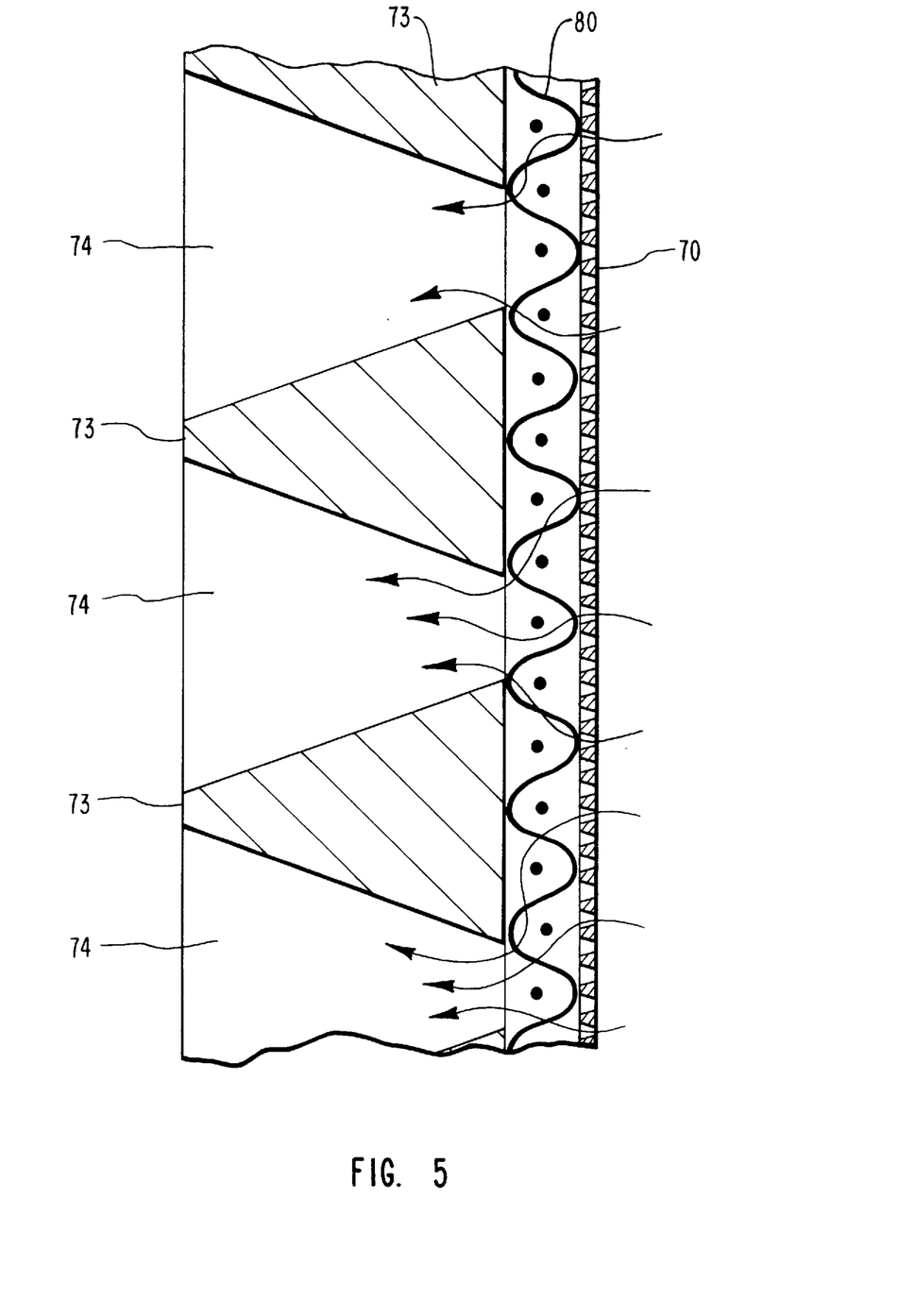
FIG. 5 is an enlarged fragmentary view illustrating a modified form of milli-screen that may be used in the extractors of FIGS. 2 and 3.

As shown in FIG. 5, which is a vertical rendering of a screen 73 and milli-screen 70, which in the horizontal extractor of FIG. 2, constantly changes angle as the diffuser rotates upward, the date particles will pile against the surface of the milli-screen 70 and tend to block the passage of extraction liquid through the holes. However, as the milli-screen rotates in the diffuser along with its supporting grid 73 (see FIG. 4), there is a shearing action between the surface of milli-screen 70 and the matrix of dates, which causes the dates to wipe the surface of the milli-screen and remove date particles, fines, and small particles which may tend to plug the holes, all of which opens up ways for the extracting liquid to pass through the holes of the milli-screen. Thus, the rotation diffuser provides a self-cleaning of the milli-screen.

As mentioned above, a milli-screen 26 and supporting grid 33 also are provided ahead of the outlet 20 for the extraction liquid. With the milli-screen 26 utilized over a supporting grid, screen wipers effectively scrape the subdivided dates that may be lodged against the upstream face.

As indicated in FIG. 2, the enriched sugar water from extraction of the dates is withdrawn at 20 by pump 24, and the extracted date fibers, are discharged at 21.

Extraction of the dates also can be carried out using a slope diffuser as shown in FIG. 3. Referring to FIG. 3, the solids to be extracted are first comminuted, such as by slicing and/or grinding in a comminutor 10. The comminutor may be a grinder, pulverizer, shredder, slicer, mill, and the like, for sub-dividing the frozen dates to be extracted. The subdivided particles are transferred to the slope diffuser 40 by an appropriate conveyor system 31 controlled by a regulator 32 which determines the rate of feed.

It will be noted that a separate hydrator 11 of the type illustrated in FIG. 2 is not shown in FIG. 3. The reason is that hydration can take place in the first lower section of the slope diffuser by submerging the date particles below the surface of the liquid 47. The submersion may be assisted by paddles or bars (not shown) for rotation with the scroll.

The subdivided date particles are introduced into the slope diffuser 40 at the solids feed inlet 41 and removed at the solids discharge 42 as extracted date fibers. The solids are conveyed from the feed end 41 to the discharge end 42 by the action of suitable helical or scroll flights 43 which are rotated by a suitable drive mechanism that rotates the shaft 60 on which the scroll is mounted in a well known manner.

Extracting liquid is introduced through inlet 45 and withdrawn at outlet 46 of the diffuser so that the liquid flows through the slope diffuser by gravity from the inlet to the outlet in flow countercurrent to the movement of the solids from the feed end 41 to the discharge end 42. In order to permit the flow of fluid the flights 43 are provided with holes or slots on the upstream sides which are covered with milli-screens 70.

At the lower end of the slope diffuser there is a separator screen 44 between the extraction area represented by the conveyor flights 43 and the liquid discharge compartment 47. The screen 44 is positioned upstream from the liquid discharge outlet 46. The purpose of the screen 44 is to separate the extracted date solids that have passed around or through the flights from the extraction liquid before the extraction liquid is withdrawn at outlet 46 as a sugar enriched water solution.

As shown in FIG. 3, the screen 44 is provided on the upstream side with a milli-screen 22. Milli-screen 22 provides a positive separation of the subdivided date particles, including small particles and fines, from the extraction liquid discharge stream. This milli-screen separation transforms the liquid discharge compartment into a "screened liquid discharge compartment." This compartment contains sugar enriched extractor liquid that can be used for back-flushing milli-screen 22. The back-flushing will float off the front surface of milli-screen 22 any overlaying materials that may be adhering to the upstream surface of the screen.

In order to prevent the accumulation of solids on the upstream face of the milli-screen 22 wiper(s) 61 is used to clean this upstream face of the screen. The wiper 61 is attached to the leading edge of the first scroll flight 43 in front of the milli-screen 22 and rotates with the shaft 60. Auxiliary wipers may also be added. Due to the ability to control the discharge rate at 46 and to keep screen 44 free from plugging by locating milli-screen 22 on its upstream face, the level of liquid 63 in the diffuser is easily maintained.

The screened liquid discharge compartment 47 preferably should be as high as the diameter of the sweep of the screen wipers, and as wide as the outermost stretch of the wiper arms, in order to give maximum screening efficiency. The depth of the screened liquid discharge compartment preferably should be sufficient to permit manual cleaning the backside of screen 44, if necessary, or for a man to climb into the compartment for cleaning, installation, or disassembly of the screen configuration.

Because the milli-screen is relatively free from plugging, the screened liquid discharge compartment 47 provides a positive way to maintain a steady level of liquid in the major extraction area of the diffuser.

As illustrated in FIG. 3, the scroll flights are in the form of rotating screens which permit the flow of liquid through the subdivided date particles and the scroll flights. The upstream side of each scroll flight is provided with a milli-screen 70 as shown in FIG. 4, and as described in connection with FIGS. 4, 5, 6 and 7 hereinafter.

The term water based solution as used herein means pure water or water containing solutes, such as sugar, or other ingredients. The extraction liquid employed to extract sugar from dates employs at least one water solution.

Referring now to FIG. 4, there is shown in a diagrammatic drawing one way in which the milli-screen 70 may be mounted and supported for use on the flights 43 of the scroll conveyor, and the separator screen 44. Also illustrated in FIG. 4 is the retention of particles, small particles and fines which collect as a mat or matrix on the upstream face of the milli-screen 70. The milli-screen 70 is provided with a plurality of milli-sized openings 71. By milli-size opening is meant openings in which the size is less than about 0.095 inches across.

The milli-size openings are preferably from 0.001 inch to about 0.095 inches across, desirably from about 0.002 inch to about 0.075 inches across, and most desirably from about 0.0025 inches to about 0.060 inches across on the upstream side. The milli-inch sized milli-openings are made by any suitable process. According to one method, the milli-openings are made by chemically etching holes in a thin metal plate, or sheet, for example, stainless steel sheet having thickness anywhere in the range from about 0.001 to 0.095 inches, but usually from about 0.002 to 0.060 inches. The milli-screen openings may be of different configurations, including, for example, slots or circles. The milli-screen openings ordinarily constitute at least about 12%, and preferably at least about 20%, of the surface area of the milli-screen, so that the extraction liquids in the diffuser may readily pass therethrough. The milli-screens may be made from sheets that are flexible, or plates which can be bent so that they can be fitted, or shaped, where needed, for example, to the helical flights of a scroll conveyor. If the screens are flexible, they are desirably supported by thicker rigid plates, grids, or frameworks (not shown), for example, as by rigid plate screens 73 as described in connection with FIGS. 4 and 5. Of course, other techniques for fabricating the milli-screens can be employed within the spirit of the present invention.

Preparation of milli-screens of the type used in the present invention is disclosed, for example, in the following U.S. Pat. Nos. 3,329,541; 3,971,682 and 4,124,437.

Figure 8:
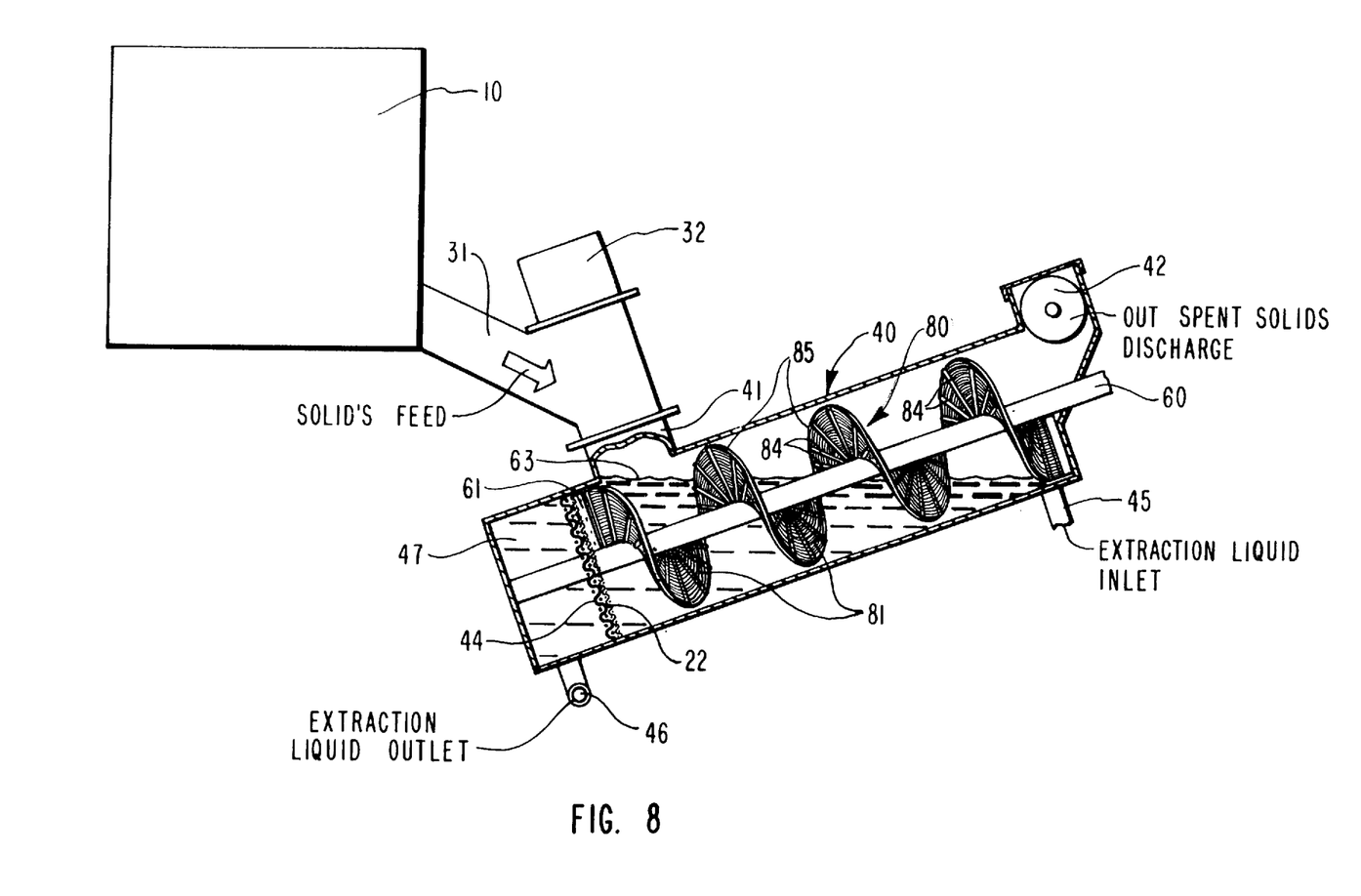
FIG. 8 is a diagrammatic illustration in longitudinal cross-section of a slope diffuser employing the form of milli-screens depicted in FIGS. 6 and 7.

The milli-size openings are provided on their downstream side with a configuration to ease the passage of liquids, in order to provide a self-cleaning feature to the upstream face of the milli-screen 70. As shown in FIG. 4, the milli-screen on the downstream side has larger openings 72 than on the upstream side 71 in order to facilitate the flow of liquid therethrough, and to reduce clogging of the passages. "Upstream" and "downstream" refers to the flow of the extraction liquid in a direction toward the liquid discharge outlet. For example, in FIG. 2, the right side of the screens are upstream and the left side of the screens are downstream to the liquid discharge outlet 20 of tank 25. In FIGS. 3 and 8, the right side of the screens is also upstream and the left side is downstream to the extraction liquid outlet.

The milli-screen is supported by a rigid plate screen 73 also provided with openings 74 for passage of liquid therethrough. It should be noted that the plate screen may be of various shapes and sizes to provide required support to milli-screens with adequate openings to pass liquid. Again, the plate screen openings are larger on the downstream side so as to facilitate the passage of liquid and to reduce clogging of the passages.

The rigid plate screen 73 may be from about ⅛ inch to ½ inch thick and provided with holes of from ⅛ inch to ½ inch in diameter on the upstream side. The milli-screen may be fastened to the rigid plate screen in any suitable manner, for example, as illustrated in FIG. 4, a clamp strip 78 with bolts 79 and lock nuts 89.

It should be noted that between the openings 74 in the plate 73 the milli-screen is contacted by a solid portion 75 of the plate 73, an arrangement which tends to reduce the flow of liquid.

Several methods may be used to increase the flow of the liquid through the milli-screen in the area of the solid portion of the plate 73. One technique is to scribe or score the solid portion of the plate 73 in the area below 75 immediately under the milli-screen to provide channels for the liquid to flow.

Another method is shown in FIG. 5 for small capacity extractors in which a calendared backup screen 80 is provided between the milli-screen 70 and the plate screen 73. As shown, the milli-screen is placed against the calendared backup screen 80 which in turn is supported by the plate screen 73.

Figure 6:
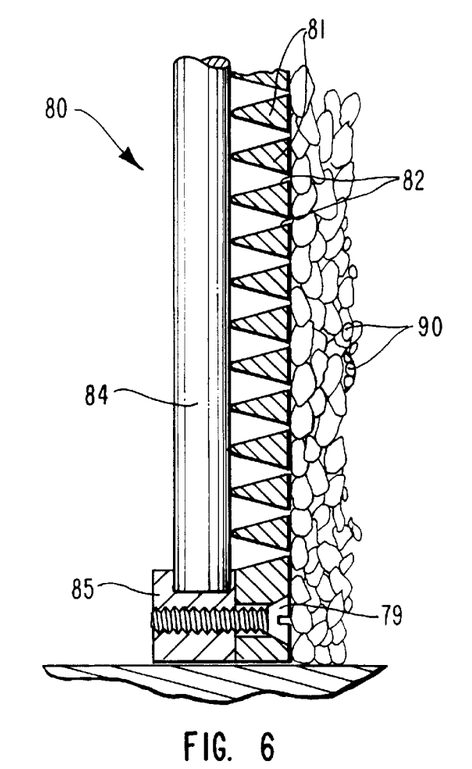
FIG. 6 is an enlarged fragmentary view illustrating another modified form of milli-screen that may be employed in the extractors of FIGS. 2 and 3.

Still another method is shown in FIG. 6 for medium capacity extractors in which the milli-screen 80 is made of elongated bars 81 mounted side-by-side with elongated slots 82 therebetween. The slots preferably are less than 0.095 inches across. The bars are tapered in cross section so that the downstream opening of the slots are wider than the upstream side. The tapered slots facilitate the flow of extracting liquid therethrough and reduce clogging. supporting arms 84 carry the bars 81. The bars are mounted sufficiently far apart to allow the flow of extraction liquid through the milli-screen 80, and sufficiently close together so that they block the passage of small particles and fines 90.

Figure 7:
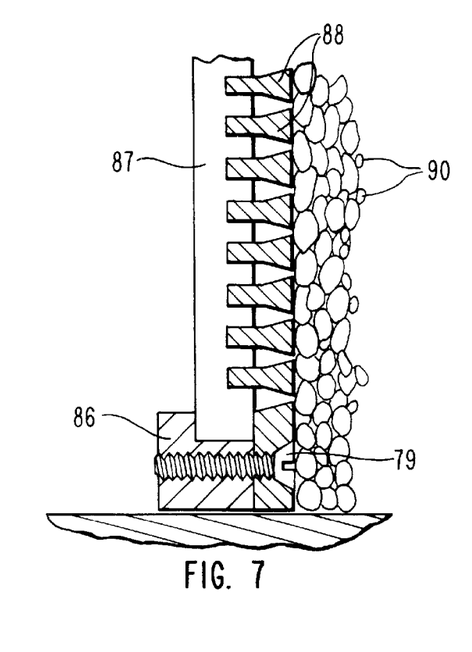
FIG. 7 is still another form of milli-screen that may be employed in the extractors of FIGS. 2 and 3.

Another method is shown in FIG. 7 for large capacity extractors. The milli-screen is made of rectangular bars 88, flared out doubly at one end only, mounted side-by-side which fit into machined slots in support bars 87. The support bars 87 are in turn supported by the border bars 86 and to which the assembly of tapered bars 88 and support bars 87 can be bolted with bolts 79. The assembly of bars can also be welded together for maximum strength and durability.

Water base solutions are the preferred liquid extraction media. The temperatures of the water base extraction liquid in the extractors of FIGS. 2, 3 and 8 preferably is elevated above ambient temperatures in order to improve the extraction efficiencies, but below the boiling point of water, usually at temperatures ranging from about 100° F. to about 210° F. at ambient pressures. The elevated temperatures may be achieved by steam jackets surrounding the rotating tank, as is well known in the extractor field. In addition, the water may be heated before being introduced into the extractor.

In the present invention, small particles and fines of dates are controlled to increase the extraction efficiencies. Accordingly, the small particles and fines in the extractor are usually more than 3% by weight, preferably at least about 5% by weight, more preferably at least about 7.5% by weight, and most desirably at least 10% by weight of the subdivided date solids. The diffuser works satisfactorily, and in some cases with increased efficiency, with fines in excess of 15% or 20% by weight of the subdivided solids. In many situations, the date particles will contain small particles and fines as high as 30% by weight of the subdivided dates in the diffuser.

One of the optional features of the present invention is to provide hydration within the diffuser, and preferably immediately upon the entrance of the subdivided dates into the diffuser. This is accomplished by submerging the date solids in the heated water solution, as explained above in connection with the slope diffuser of FIGS. 3 and 8.

The date particles introduced in the diffuser may be introduced in a dry or wet form. In dry form, the solids are at least partially frozen date particles. In wet form, the solids may be introduced, for example, in a slurry, in a puree, in a syrup, or in other liquid, or semi-liquid forms.

Referring again to FIG. 1, at stage I, the sugar enriched water solution from the extraction process may be purified by new purification techniques. Purification by ultrafiltration is followed by passing the sugar enriched water solution through one or more carbon beds, such as, bone char or activated carbon. An ion exchange process may follow.

After purification, the sugar enriched water solution may be reduced by evaporation of at least some of the water to form a liquid sugar product containing the three sugars: fructose, sucrose, and glucose. The extracted sugar product preferably is substantially free from other natural date ingredients. By substantially free is meant less than about 10%, preferably less than about 5%, and desirably less than 2%, by weight on a dry weight basis of other date ingredients. The amounts of such sugars in the product on a dry basis may range as follows: fructose from about 70% to about 10%; sucrose from about 10% to about 80%; and glucose from about 25% to about 1% by weight. The liquid product containing the three sugars may be packaged for sale to the customer. As one expedient, the enriched liquid sugar containing those three sugars may be maintained in a storage tank for later packaging and sale.

Alternatively, the sugar enriched water may be dehydrated sufficiently to form a solid product containing the three sugars: fructose, sucrose, and glucose. As novel commercial steps, freeze-drying, oven-drying under vacuum, and spray-drying may be used for reducing the amount of water sufficiently to produce the solid phase.

For example, oven-drying may be carried out at a vacuum in a range from about 20 to about 27 inches of mercury. At 26 inches of mercury vacuum, the temperatures may range from about 126° F. to about 166° F.

The extracted date fiber from the extractor is dewatered at R with a suitable press or mill, for example, a conventional pulp press as used in the sugar beet industry. The water from the dewatering operation may be returned to the extractor as indicated in FIG. 1.

According to one alternative process of the invention, the dewatered date fibers from the extractor are used to make a novel food product by mixing with the ground date seeds.

The novel food products are made as indicated by FIG. 1. The seeds from the dates are ground using machinery for pulverizing or grinding the seeds to a fine powder, or flour. The ground seeds then are mixed with the extracted date fibers. The extracted and dewatered date fibers mixed with the ground seeds contain reduced amounts of sugars, usually less than 20% by weight, preferably less than 10% by weight, and desirably less than about 5% by weight of sugars. It will be advantageous in many cases, for example, product sold to diabetics, to have the sugar content below about 1% by weight.

The ground seeds contain high amounts of protein and can be admixed with the extracted date fibers in a wide range of amounts from 0.10% to about 99.9% by weight, and usually from about 1% to about 95% by weight, of the dewatered date fibers. Other seasonings and condiments may be added to improve the taste. The product is packaged in a form suitable for sale to the customers.

From the foregoing, the processes of the invention should be apparent. Pitted dates are frozen so that they can be comminuted, such as by slicing, chopping, or grinding, while frozen. After comminuting, the sugars are extracted from the date particles with water in an extractor of the type as shown in U.S. Pat. No. 5,456,893. Surprisingly, it has been found that the process extracts the three sugars: fructose, sucrose, and glucose, simultaneously. Preferably, after extraction, at least some of the water of the sugar-water solution is removed, such as by evaporation before the sugar solution is introduced into commerce. The sugar-water solution may be sold as a novel article of commerce which contains three sugars: fructose, sucrose and glucose. Alternatively, sufficient water may be removed from the sugar-water solution, for example, as by freeze-drying, oven-drying under vacuum, or spray-drying, and the sugars formed into the solid phase as another novel sugar product.

The liquid and solid sugar products containing fructose, sucrose, and glucose, substantially free from natural date impurities are novel and have many uses. The liquid sugar products are useful as sweeteners, for example, as sweeteners for soft drinks. The solid sugar products may be used as industrial and table sugars.

The combination of the three sugars in one product is believed to have unique benefits for the human body; for example, it is believed that glucose is ingested first, then fructose, and then sucrose, so as to extend the time period over which the sugars are taken into the body.

Novel food products can be made from the extracted and dewatered date fibers. The seeds may be ground to a powder and mixed with the dewatered date fibers discharged from the extraction process to make a food product high in protein and dietary fiber.

The specification and drawings are presented above to aid in the understanding of the invention, but not as limitations thereto. Many variations and modifications of the invention can be made without departing from the spirit and scope of the invention as set forth in the following claims.

I claim:

1. A process for extracting sugar from dates which comprises the steps of:
   at least partially freezing pitted dates;
   subdividing said pitted dates into particle sizes suitable for extraction while said pitted dates are at least partially frozen;
   contacting the subdivided date particles with at least one extraction liquid for a sufficient time and at sufficiently elevated temperatures so as to extract at least some sugar therefrom; and
   separating the date fibers from the sugar enriched extraction liquid.

2. The process of claim 1 in which said subdivided dates contain at least some small particles.

3. The process of claim 1 in which said subdivided dates contain at least about 3% by weight of small particles.

4. The process of claim 1 in which said subdivided dates contain at least about 5% by weight of small particles.

5. The process of claim 1 in which said subdivided dates contain at least about 10% by weight of small particles.

6. The process of claim 1 in which said subdivided dates contain at least about 20% by weight of small particles.

7. The process of any one of claims 2, 3, 4, 5, or 6 in which said subdivided dates are separated from the sugar enriched extraction liquid by conducting at least a portion of the extraction liquid through at least one milli-screen containing a plurality of discrete milli-size openings.

8. The process of any one of claims 1, 2, 3, 4, 5, or 6 in which the sugar enriched extraction liquid is purified.

9. The process of any one of claims 1, 2, 3, 4, 5, 6 or 8 in which the sugar enriched extraction liquid is further treated to reduce the water content.

10. The process of any one of claims 1, 2, 3, 4, 5, or 6 in which the extracted date fibers are mixed with ground date seeds.

11. The process of claims 1, 2, 3, 4, 5, or 6 in which said extraction of sugar from the subdivided dates is performed by pushing the date particles in one direction and flowing at least one water based extraction liquid in the opposite direction in contact with the date particles in counter-current diffusion for extraction of at least some sugar.

12. A process for extracting sugar from dates which comprises the steps of:

at least partially freezing dates;

subdividing said dates while at least partially frozen into particle sizes suitable for extraction;

contacting the subdivided date particles with at least one water based extraction liquid for a sufficient time and at sufficiently elevated temperatures by countercurrent extraction so as to extract at least some sugar therefrom; and separating at least some of the date fibers from the sugar enriched water based extraction liquid.

13. The process of claim 12 in which said subdivided dates contain at least some small particles.

14. The process of claim 12 in which said subdivided dates contain at least about 3% by weight of small particles.

15. The process of claim 12 in which said subdivided dates contain at least about 5% by weight of small particles.

16. The process of claim 12 in which said subdivided dates contain at least about 10% by weight of small particles.

17. The process of claim 13 in which said subdivided dates contain at least about 20% by weight of small particles.

18. The process of claim 12 in which the enriched water base extraction liquid is purified by at least one ultrafiltration step.

19. The process of claim 9, 12, or 18 further characterized in that the extracted sugar is dried under reduced pressures less than atmospheric in vacuum oven drying.

20. The process of claim 9, 12 or 18 further characterized in that the extracted sugar is dried under reduced pressures less than atmospheric by freeze drying.

21. The process of claim 9, 12 or 18 further characterized in that the extracted sugar is dried by spray drying.

* * * * *

UNITED STATES PATENT AND TRADEMARK OFFICE
CERTIFICATE OF CORRECTION

PATENT NO. : 5,853,488
DATED : December 29, 1998
INVENTOR(S) : Barnard S. Silver It is certified that error appears in the above-identified patent and that said Letters Patent is hereby corrected as shown below:

On the Title Page

Column 1,
Item [76], please change "city" to --City--.

Column 2,
Line 2, please change "Osternan" to --Osterman--.
Line 12, please change "5,456,893" to --5,451,893--.
Line 13, please change "8,700,464" to --5,700,464--.
Line 1, under "OTHER PUBLICATIONS", please change "Shubber" to --Shubbar--.

In the Claims

Claim 17,
Line 1, please change "13" to --12--.

Signed and Sealed this

Nineteenth Day of June, 2001

*Attest:*

*Attesting Officer*

NICHOLAS P. GODICI
*Acting Director of the United States Patent and Trademark Office*